United States Patent
Lei et al.

(10) Patent No.: US 12,317,236 B2
(45) Date of Patent: May 27, 2025

(54) METHOD AND APPARATUS FOR INDICATING TDD UPLINK-DOWNLINK CONFIGURATION

(71) Applicant: LENOVO (BEIJING) LIMITED, Beijing (CN)

(72) Inventors: Haipeng Lei, Beijing (CN); Zhi Yan, Beijing (CN); Xiaodong Yu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 558 days.

(21) Appl. No.: 17/622,663

(22) PCT Filed: Jul. 12, 2019

(86) PCT No.: PCT/CN2019/095804
§ 371 (c)(1),
(2) Date: Dec. 23, 2021

(87) PCT Pub. No.: WO2021/007711
PCT Pub. Date: Jan. 21, 2021

(65) Prior Publication Data
US 2022/0256534 A1    Aug. 11, 2022

(51) Int. Cl.
*H04W 72/0446* (2023.01)
*H04L 5/14* (2006.01)
*H04W 72/23* (2023.01)

(52) U.S. Cl.
CPC .......... *H04W 72/0446* (2013.01); *H04L 5/14* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2017/0332396 | A1* | 11/2017 | Liao | .......... H04L 27/26025 |
| 2019/0014576 | A1* | 1/2019 | Liao | .......... H04W 72/0446 |
| 2019/0053085 | A1 | 2/2019 | Pao et al. | |

FOREIGN PATENT DOCUMENTS

| | | |
|---|---|---|
| CN | 108093487 A | 5/2018 |
| CN | 109802816 A | 5/2019 |

OTHER PUBLICATIONS

International Searching Authority, "Written Opinion of the International Searching Authority," PCT/CN2019/095804, Apr. 8, 2020, pp. 1-4.

(Continued)

*Primary Examiner* — Christine T Duong
(74) *Attorney, Agent, or Firm* — Kunzler Bean & Adamson

(57) ABSTRACT

The present application relates to a method and apparatus for indicating a TDD uplink-downlink configuration. One embodiment of the subject application provides a method performed by a user equipment (UE) for wireless communication, comprising: receiving, from a base station (BS), a signal indicating an uplink-downlink transmission pattern, wherein the uplink-downlink transmission pattern having a first transmission period includes a first plurality of type-1 slots, a second plurality of type-2 slots, and a third plurality of type-3 slots, wherein the type-1 slots only comprise downlink symbols, and the type-2 slots only comprise uplink symbols; and monitoring a transmission of downlink control channel within the first plurality of type-1 slots.

20 Claims, 10 Drawing Sheets

(56) References Cited

OTHER PUBLICATIONS

3GPP, 3rd Generation Partnership Project; Technical Specification Group Radio Access Network; NR; Physical layer procedures for control (Release 15), 3GPP TS 38.213 V15.6.0 (Jun. 2019) Jun. 24, 2019.

* cited by examiner

METHOD AND APPARATUS FOR INDICATING TDD UPLINK-DOWNLINK CONFIGURATION

TECHNICAL FIELD

The subject application relates to 3rd Generation Partnership Project (3GPP) 5G wireless communication technology, especially to a method and apparatus for indicating a Time Division Duplexing (TDD) uplink (UL)-downlink (DL) configuration.

BACKGROUND OF THE INVENTION

In NR, Group-common Physical Downlink Control Channel (PDCCH) indicates dynamic Slot Format Indication (SFI) for a group of User Equipment (UE). Since a dynamically scheduled UE knows the assigned symbols are used for uplink or downlink transmission based on UL grant or DL assignment, the group-common SFI signaling is primarily intended for non-scheduled UEs.

Regarding New Radio (NR) Internet of Things (IoT) UE, it is desirable to reduce the UE cost and implementation complexity. Therefore, it may be unnecessary for a NR IoT UE to monitor a group-common PDCCH for SFI. The NR IoT UE just follows the DL assignment or UL grant to receive or transmit data on the assigned resources. It is feasible not to design uplink-downlink transmission patterns, SFI, or group-common PDCCH for indicating the SFI. In this sense, the problem is how to indicate the NR IoT UE the resource for downlink or uplink transmission.

SUMMARY

It is desirable to provide a solution for indicating the TDD uplink-downlink configuration to a NR IoT UE.

One embodiment of the subject application provides a method performed by a user equipment (UE) for wireless communication, including: receiving, from a base station (BS), a signal indicating an uplink-downlink transmission pattern, wherein the uplink-downlink transmission pattern having a first transmission period includes a first plurality of type-1 slots, a second plurality of type-2 slots, and a third plurality of type-3 slots, wherein the type-1 slots only include downlink symbols, and the type-2 slots only include uplink symbols; and monitoring a transmission of downlink control channel within the first plurality of type-1 slots.

Another embodiment of the subject application provides a method performed by a base station (BS) for wireless communication, including: transmitting, to a user equipment (UE), a signal indicating an uplink-downlink transmission pattern, wherein the uplink-downlink transmission pattern having a first transmission period includes a first plurality of type-1 slots, a second plurality of type-2 slots, and a third plurality of type-3 slots, wherein the type-1 slots only include downlink symbols, the type-2 slots only include uplink symbols; and transmitting a downlink control channel within the first plurality of type-1 slots.

Yet another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a user equipment (UE) for wireless communication, including: receiving, from a base station (BS), a signal indicating an uplink-downlink transmission pattern, wherein the uplink-downlink transmission pattern having a first transmission period includes a first plurality of type-1 slots, a second plurality of type-2 slots, and a third plurality of type-3 slots, wherein the type-1 slots only include downlink symbols, and the type-2 slots only include uplink symbols; and monitoring a transmission of downlink control channel within the first plurality of type-1 slots.

Still another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a base station (BS) for wireless communication, including: transmitting, to a user equipment (UE), a signal indicating an uplink-downlink transmission pattern, wherein the uplink-downlink transmission pattern having a first transmission period includes a first plurality of type-1 slots, a second plurality of type-2 slots, and a third plurality of type-3 slots, wherein the type-1 slots only include downlink symbols, the type-2 slots only include uplink symbols; and transmitting a downlink control channel within the first plurality of type-1 slots.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for indicating a TDD uplink-downlink configuration. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
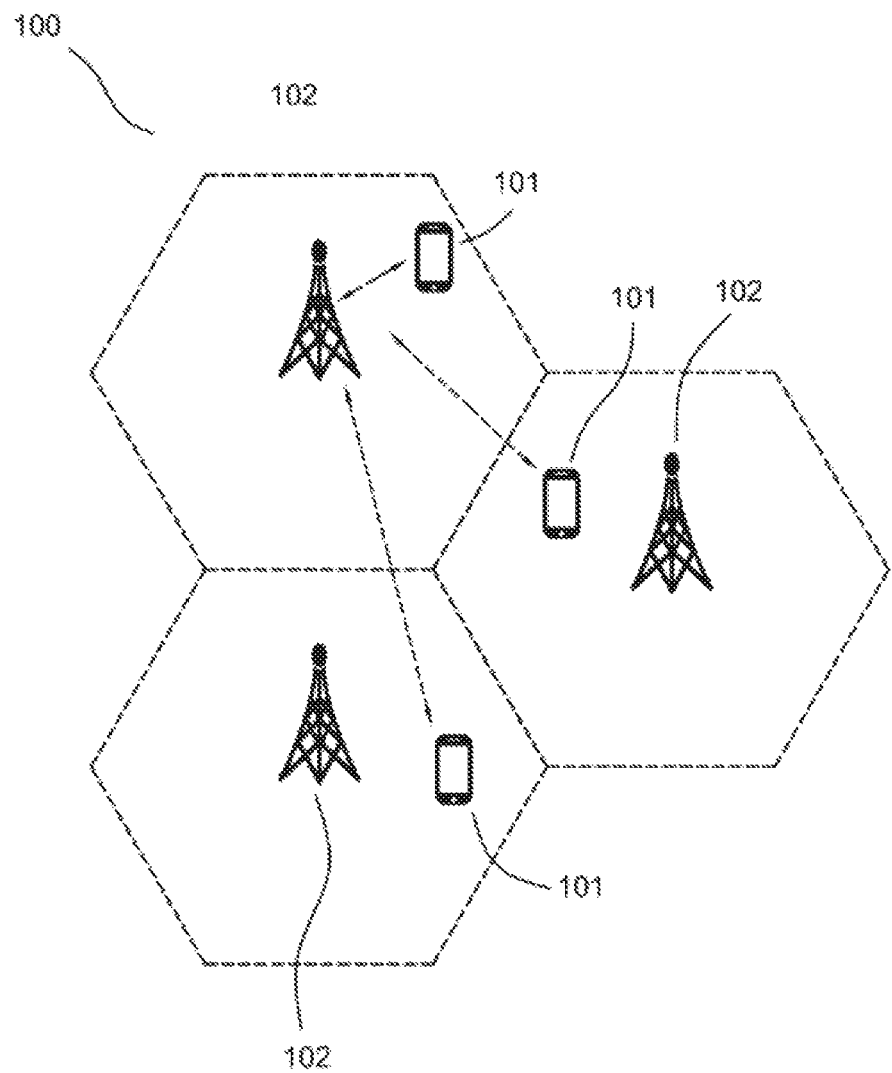
FIG. 1 illustrates a schematic diagram of a wireless communication system in accordance with some embodiments of the present application.

FIG. 1 depicts a wireless communication system 100 according to an embodiment of the present disclosure.

As shown in FIG. 1, the wireless communication system 100 includes User Equipment (UE) 101 and Base Stations (BS) 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using a single-carrier frequency division multiple access (SC-FDMA) or OFDM scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

In 3GPP LTE enhanced machine type communication (eMTC) protocol, the physical layer channel design is based on the bandwidth of 1.4 MHz, because 1.4 MHz is the minimum supported LTE bandwidth. With the minimum bandwidth of 1.4 MHz, an eMTC device may greatly reduce cost and an implementation complexity. In LTE Frequency Division Duplexing (FDD), the downlink reception and uplink transmission are working in different frequencies from a UE's point of view.

In LTE Time Division Duplexing (TDD), the single carrier frequency and uplink and downlink transmissions are separated in the time domain on a cell basis. Uplink and downlink transmissions are non-overlapping in time, both from a cell and a UE perspective. There are seven TDD uplink-downlink configurations predefined in LTE standard and shown in Table 4.2-2 of 3GPP TS 36.211, which provides different uplink to downlink subframe ratios for the uplink and downlink traffic adaptation. The BS can select the most appropriate TDD uplink-downlink configuration based on the uplink and downlink traffic ratio then indicate the selected TDD uplink-downlink configuration via System Information Block-1 (SIB-1) signaling. The BS can adjust the TDD uplink-downlink configuration semi-statically by updating the SIB-1 message.

In Rel-12, TDD enhanced Interference Mitigation and Traffic Adaptation (eIMTA) is specified with the purpose of supporting dynamic TDD uplink-downlink reconfiguration via L1 signaling. In detail, the TDD uplink-downlink configuration can be adjusted every 10 ms, i.e., a frame. It is noted that there is no new TDD uplink-downlink configuration specified. Based on uplink and downlink traffic ratio, the most appropriate TDD uplink-downlink configuration is selected from the seven existing TDD uplink-downlink configurations. One DCI format 1C with Cyclic Redundancy Check (CRC) scrambled by eIMTA-Radio Network Temporary Identity (RNTI) is used to indicate the determined TDD uplink-downlink configuration to UE.

5G NR uses dynamic TDD and the 14 symbols of one slot can be dynamically allocated to either all uplink symbols or all downlink symbols or partial downlink and partial uplink symbols in the same slot purely based on the scheduler decision. This enables more rapid uplink-downlink reconfiguration in time scale of one slot. Thus, this dynamic TDD in NR can better match traffic variations in uplink and downlink, which are particularly pronounced in dense deployments with a relatively small number of users per base station.

At present, NR has defined 56 slot formats for normal Cyclic Prefix (CP) as show in Table 11.1.1-1 of 3GPP TS38.213. Each slot format represents a combination of OFDM symbols denoted "downlink", "flexible", and "uplink", respectively. There are downlink-only and uplink-only slot formats which are useful for FDD, as well as partial uplink and downlink slots for TDD in the Table 11.1.1-1.

In NR, there are three different signaling mechanisms to provide information to the UE regarding whether the symbols of a given slot are scheduled for uplink or downlink transmission:
1. DCI for PDSCH scheduling or PUSCH scheduling, which implicitly indicates the assigned symbols for downlink transmission or uplink transmission to the scheduled UE;
2. RRC signaling, which provides a certain TDD uplink-downlink pattern to UE in order to provide coexistence with LTE TDD systems; and
3. Group-common PDCCH, which indicates dynamic slot format indication (SFI) for a group of UEs.

The SFI monitoring is configured for a group of UEs and the SFI message can be regarded as an index into an RRC-configured table where each entry in the table is a slot format combination including one or multiple downlink/flexible/uplink patterns predefined in Table 11.1.1-1 for one or multiple slots. Since a dynamically scheduled UE knows the assigned symbols are used for downlink or uplink transmission based on DL assignment or UL grant, the group-common SFI signaling is primarily intended for the non-scheduled UEs.

Regarding the NR IoT UE, it is desirable to reduce UE cost and implementation complexity. Consequently, it may be unnecessary for a NR IoT UE to monitor a group-common PDCCH for SFI. The NR IoT UE just follows the DL assignment or the UL grant to receive or transmit data on the assigned resources. It is feasible not to design uplink-downlink split patterns, SFI and group-common PDCCH for SFI indicating. In that sense, the problem is how to indicate the NR IoT UE the resource for downlink or uplink transmission.

In this disclosure, we provide the periodic TDD uplink-downlink transmission pattern to a NR IoT UE, to indicate the NR IoT UE the resource for downlink or uplink transmission. The periodic TDD uplink-downlink transmission pattern is configured semi-statically via System Information Block (SIB) or UE-specific Radio Resource Control (RRC) signaling for the NR IoT UE.

Figure 2:
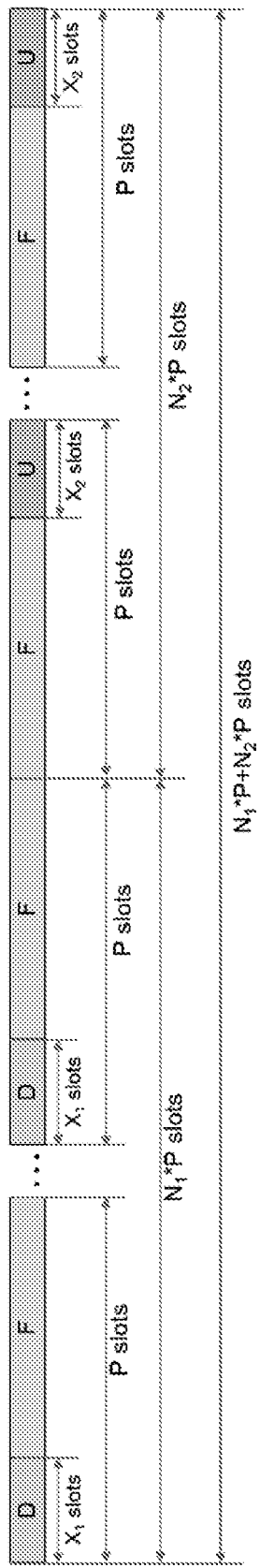
FIG. 2 illustrates an exemplary periodic TDD uplink-downlink transmission pattern in accordance with some embodiments of the present application.

FIG. 2 illustrates an exemplary periodic TDD uplink-downlink transmission pattern in accordance with some embodiments of the present application.

In this periodic TDD uplink-downlink transmission pattern, three different types of slots are included. The capital letter "D" is short for "Downlink," which means that slots marked with the capital letter "D" are for downlink transmission. The capital letter "U" stands for "Uplink," which means that the slots marked with the capital letter "U" are for uplink transmission. The capital letter "F" represents "Flexible," in this disclosure, the "F" slots in every P slots are reserved for enhanced mobile broadband/ultra-reliability low-latency communication (EMBB/URLLC). For example, the "F" slots are for downlink transmission or uplink transmission according to the monitored downlink control channel. Alternatively, the "F" slots are unavailable for the IoT UE for downlink transmission or uplink transmission. Namely, downlink transmissions can only be transmitted on the downlink slots, and the uplink transmission can only be transmitted on the uplink slots. In another embodiment, the IoT UE assumes downlink transmission or uplink transmission can occur on the "F" slots based on the downlink assignment or UL grant in case the downlink assignment or UL grant schedules resources on the "F" slots.

The duration of the periodic TDD uplink-downlink transmission pattern in FIG. 2 is $N_1 \times P$ slots plus $N_2 \times P$ slots, wherein $N_1$ and $N_2$ are integers greater than 0, the duration of the P slots for IoT is determined based on the reference subcarrier spacing, i.e., $P \times 2^u$ ms, where u is determined by the Subcarrier Spacing (SCS) configuration. The boundary of the P slots for IoT is aligned with that for eMBB/URLCC in order to align the slot boundary. In one embodiment, if the subcarrier spacing is fixed to be 15 kHz for NR IoT, then the parameter, reference subcarrier spacing, can be removed from the definition/configuration of the periodic uplink-downlink transmission pattern.

In particular, the periodic TDD uplink-downlink transmission pattern includes a first plurality of first sub-patterns, i.e., the $N_1$ first sub-patterns, and a second plurality of second sub-patterns, i.e., the $N_2$ second sub-patterns, following the first plurality of first sub-patterns. Each of the first sub-patterns is composed of the "D" slots and the "F" slots, wherein the "D" slots at the beginning and the "F" slots at the end in each first sub-pattern. Each of the second sub-pattern is composed of the "F" slots and the "U" slots, wherein the "F" slots at the beginning, and the "U" slots at the end in each second sub-pattern. The duration of each of the first sub-patterns is P slots, and the duration of each of the second sub-patterns is also P slots.

That is, the first plurality of first sub-patterns include $N_1 \times P$ slots, and the second plurality of second sub-patterns include $N_2 \times P$ slots. The duration of P for IoT is aligned with the duration of slot configuration period for eMBB/URLLC when the IoT application is deployed with eMBB/URLLC on the same carrier.

Each first sub-pattern in the first plurality of first sub-patterns, namely, the $N_1 \times P$ slots, includes $X_1$ "D" slots, and the rest slots are the "F" slots. The duration of each first sub-pattern is P slots, thus the number of slots of the "F" slots is P minus $X_1$. The "D" slots are always at the beginning of the P slots, and the "F" slots are at the rest of the P slots in each first sub-pattern, and the "D" slots are evenly distributed in the first plurality of first sub-patterns. In one embodiment, the number $X_1$ is configured to be equal to or shorter than the number of downlink slots configured in the TDD UL and DL configuration for eMBB/URLLC. For example, in 3GPP TS38.331, the number of downlink slots is represented using nrofDownlinkSlots of TDD-UL-DL-ConfigurationCommon. Therefore, the number $X_1$ is configured to be equal to or shorter than nrofDownlinkSlots of TDD-UL-DL-ConfigurationCommon. Alternatively, the number $X_1$ could be longer than the above number, under this situations, the BS has to ensure there is no uplink and downlink transmission simultaneously to avoid full duplex issues.

Each second sub-pattern in the second plurality of second sub-patterns, namely, $N_2 \times P$ slots, includes $X_2$ "U" slots, and P minus $X_2$ "F" Slots. Thus the duration of each second sub-pattern is P slots. The "U" slots are always at the end of the P slots, and the "F" slots are at the rest of the P slots in each second sub-pattern, and the "U" slots are also evenly distributed in the second plurality of second sub-patterns. In one embodiment, the number $X_2$ is configured to be equal to or shorter than the number of uplink slots configured in the TDD UL and downlink configuration for eMBB/URLLC. For example, in 3GPP TS38.331, the number of uplink slots is represented using nrofUplinkSlots of TDD-UL-DL-ConfigurationCommon. Therefore, the number $X_2$ is configured to be equal to or shorter than nrofUplinkSlots of TDD-UL-DL-ConfigurationCommon. Alternatively, the number $X_2$ could be longer than the above number, under this situations, the BS has to ensure there is no uplink and downlink transmission simultaneously to avoid full duplex issues.

In the periodic TDD uplink-downlink transmission pattern depicted in FIG. 2, partial slots for downlink transmission and/or uplink transmission are not supported. In this way, not only downlink and uplink switching for the IoT UE in same slot are avoided, but also full slot TBS for IoT UE determination is achieved.

The IoT UE only performs PDCCH monitoring in the downlink slots. So, if no PDSCH needs to be received, the IoT UE enters into the silent mode for power saving during $P-X_1$ slots of every P slots of every $N_1 \times P$ slots. Correspondingly, if no PUCCH or PUSCH needs to be transmitted, the IoT UE enters into the silent mode for power saving during every $N_2 \times P$ slots. In other words, the IoT UE enters into silent mode in the "F" slots and "U" slots in the periodic TDD uplink-downlink transmission pattern if no PUCCH or PUSCH needs to be transmitted or if no PDSCH needs to be received. Therefore, the power of the IoT UE is greatly reduced.

PDCCH repetition can be supported in every P slots or every $N_1 \times P$ slots in each uplink-downlink transmission pattern period, and time diversity gain can be achieved for PDCCH repetition. The value of $N_1$ should be set to allow all the repetitions of one DCI in the $X_1$ slots of every P slots or in the $N_1 \times X_1$ slots of every $N_1 \times P$ slots. For example, if $Z_1$ repetitions are needed to transmit one DCI format, then $X_1$ can be divided by $Z_1$ or $N_1 \times X_1$ can be divided by $Z_1$. For another example, assuming $Z_2$ repetitions are needed to transmit one downlink TB, then $P-X_1$ can be divided by $Z_2$ or $N_1 \times (P-X_1)$ can be divided by $Z_2$.

PUCCH repetition can be supported in every P slots or every $N_2 \times P$ slots in each uplink-downlink transmission pattern period, and time diversity gain can be achieved for PUCCH repetition. The value of $N_2$ should be set to allow all the repetitions of one UCI in the $X_2$ slots of every P slots or in the $N_2 \times X_2$ slots of every $N_2 \times P$ slots. In one embodiment, assuming $K_1$ repetitions are needed to transmit one UCI, then $X_2$ can be divided by $Z_2$ or $N_2 \times X_2$ can be divided by $K_1$. In another embodiment, assuming $K_2$ repetitions are needed to transmit one uplink TB, then $P-X_2$ can be divided by $K_2$ or $N_2 \times (P-X_2)$ can be divided by $K_2$.

Figure 3:
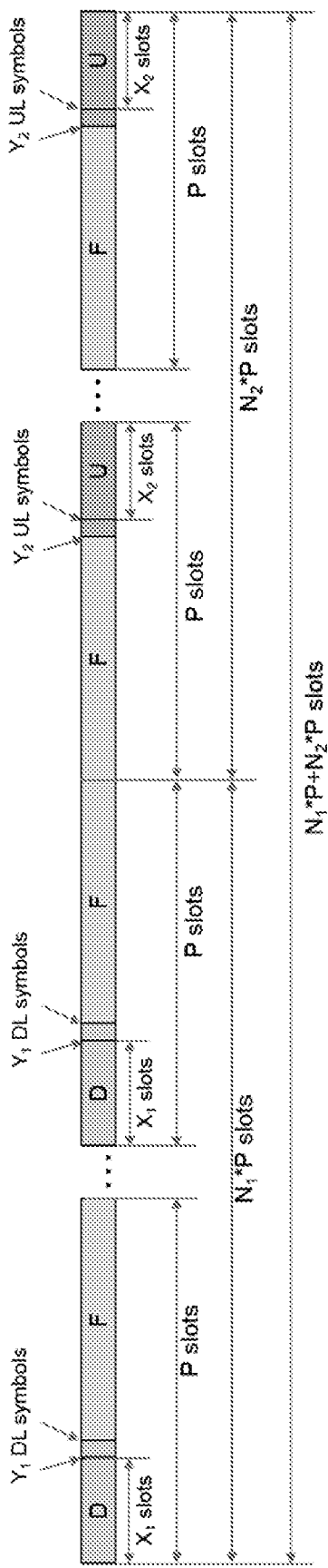
FIG. 3 illustrates another exemplary periodic TDD uplink-downlink transmission pattern in accordance with some embodiments of the present application.

FIG. 3 illustrates another exemplary periodic TDD uplink-downlink transmission pattern in accordance with some embodiments of the present application.

In this periodic TDD uplink-downlink transmission pattern, five different types of slots are included. The "D" slots, the "U" slots, and the "F" slots have the identical meanings as in FIG. 2. Additionally, the periodic TDD uplink-downlink transmission pattern includes a number of $Y_1$ consecutive downlink symbols, which are at the beginning of the $(X_1+1)^{th}$ slot of every P slots of $N_1 \times P$ slots, i.e., at the beginning of the slot following the last slot of the $X_1$ slots of every P slots of $N_1 \times P$ slots; and a number of $Y_2$ consecutive uplink symbols, which are at the end of the $(P-X_2)^{th}$ slot of every P slots of $N_2 \times P$ slots, i.e., at the end of the slot preceding the first slot of the $X_2$ slots of every P slots of $N_2 \times P$ slots. In the embodiment in FIG. 3, every P slots in the $N_1 \times P$ slots includes downlink symbols at the beginning of the $(X_1+1)^{th}$ slot of every P slots, and every P slots in the $N_2 \times P$ slots includes $Y_2$ uplink symbols at the end of the $(P-X_2)^{th}$ slot. It is noted that the values of $Y_1$ and $Y_2$ are not larger than 14.

Different from the periodic TDD uplink-downlink transmission pattern in FIG. 2, partial slots for downlink transmission and/or uplink transmission are supported in the periodic TDD uplink-downlink transmission pattern in FIG. 3. To fully align with eMBB/URLLC, the parameters, $X_1$, $X_2$, $Y_1$, $Y_2$ and P can be set to the same values to semi-static uplink-downlink configuration for eMBB/URLLC, respectively.

Figure 4:
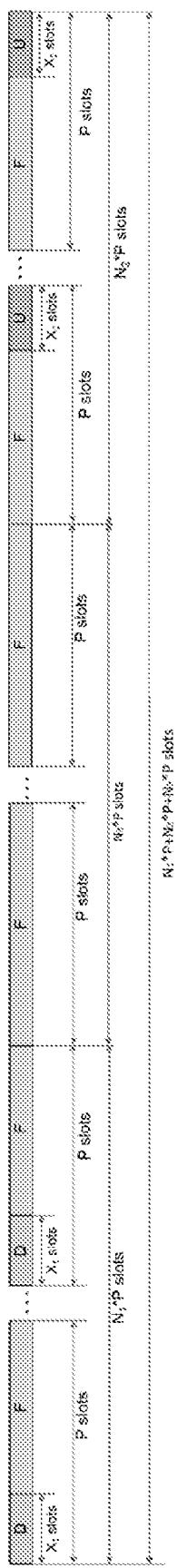
FIG. 4 illustrates another exemplary periodic TDD uplink-downlink transmission pattern in accordance with some embodiments of the present application.

FIG. 4 illustrates another exemplary periodic TDD uplink-downlink transmission pattern in accordance with some embodiments of the present application. The periodic TDD uplink-downlink transmission pattern depicted in FIG. 4 includes three pluralities of different sub-patterns, the first plurality of first sub-patterns is the $N_1 \times P$ slots, the second plurality of second sub-patterns is the $N_2 \times P$ slots, and the third plurality of third sub-pattern is the $N_3 \times P$ slots. That is, the first plurality of first sub-patterns includes $N_1 \times P$ slots, the second plurality of second sub-patterns includes $N_2 \times P$ slots, and the third plurality of third sub-patterns includes $N_3 \times P$ slots. $N_1$, $N_2$ and are $N_3$ are three integral numbers greater than 0, and the duration of the periodic TDD uplink-downlink transmission pattern in FIG. 4 is $N_1 \times P$ slots plus $N_2 \times P$ slots plus $N_3 \times P$ slots. The structures of the first plurality of first sub-patterns and second plurality of second sub-patterns are identical to those in the periodic TDD uplink-downlink transmission pattern in FIG. 2. Regarding the third plurality of third sub-patterns, the $N_3$ P slots only include the "F" slots.

Figure 5:
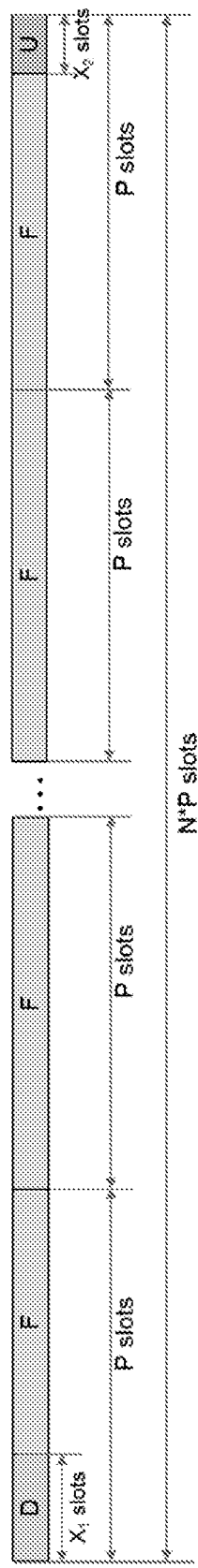
FIG. 5 illustrates another exemplary periodic TDD uplink-downlink transmission pattern in accordance with some embodiments of the present application.

FIG. 5 illustrates another exemplary periodic TDD uplink-downlink transmission pattern in accordance with some embodiments of the present application.

In this pattern, three different types of slots are included. The "D" slots, the "U" slots, and the "F" slots, they have the identical meanings as those in FIG. 2. The periodic TDD uplink-downlink transmission pattern depicted in FIG. 5 includes N×P slots, where N is an integral number, and the duration of the periodic TDD uplink-downlink transmission pattern in FIG. 5 is N×P slots.

The first P slots include $X_1$ "D" slots, and P minus $X_1$ "F" slots, the last P slots include $X_2$ "U" slots, and P minus $X_2$ "F" Slots. The rest of the P slots, that is, the second P slots to the second to last P slots, only include the "F" slots.

The IoT UE only performs PDCCH monitoring in the downlink slots, namely, only in the $X_1$ "D" slots of every N×P slots in FIG. 5. So, if no PUCCH or PUSCH needs to be transmitted or no PDSCH needs to be received, the IoT UE enters into the silent mode for power saving during $N \times P - X_1$ slots of every N×P slots. In other words, the IoT UE enters into silent mode in the "F" slots and "U" slots in the pattern. Therefore, the power of the IoT UE is reduced.

PDCCH repetition can be supported within the N×P slots when PDCCH repetition in the $X_1$ "D" slots is reliable enough in each TDD uplink-downlink transmission pattern. Correspondingly, PDCCH repetition can be supported across N×P slots when PDCCH repetition in the $X_1$ "D" slots is not reliable enough in each TDD uplink-downlink transmission pattern. In one embodiment, assuming Z repetitions are needed to transmit one DCI format, then $Z/X_1$ consecutive TDD U uplink-downlink transmission pattern periods are necessary.

PUCCH repetition can be supported within the N×P slots when PDCCH repetition in the $X_2$ "U" slots is reliable enough in each TDD uplink-downlink transmission pattern. Correspondingly, PUCCH repetition can be supported across N×P slots when PUCCH repetition in $X_2$ "U" slots is not reliable enough in each TDD uplink-downlink transmission patterns period. In one embodiment, assuming K repetitions are needed to transmit one UCI, then $K/X_2$ consecutive TDD uplink-downlink transmission pattern periods are necessary.

Figure 6:
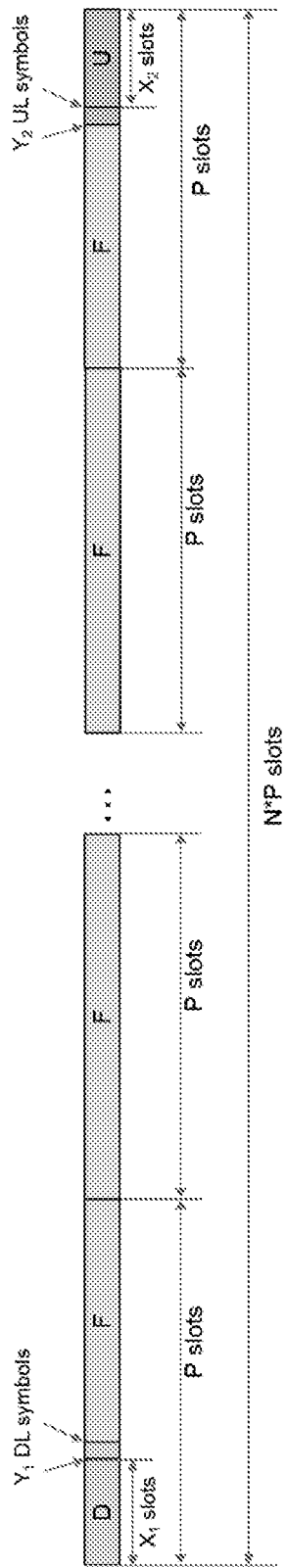
FIG. 6 illustrates another exemplary periodic TDD uplink-downlink transmission pattern in accordance with some embodiments of the present application.

FIG. 6 illustrates another exemplary periodic TDD uplink-downlink transmission pattern in accordance with some embodiments of the present application.

In this pattern, five different types of slots are included. The "D" slots, the "U" slots, and the "F" slots have the identical meanings as those in FIG. 2. Additionally, the periodic TDD uplink-downlink transmission pattern includes a number of $Y_1$ consecutive downlink symbols, which are at the beginning of the $(X_1+1)^{th}$ slot of the first P slots of N×P slots, i.e., at the beginning of the slot following the last slot of the $X_f$ slots of the N×P slots; and a number of $Y_2$ consecutive uplink symbols, which are at the end of the $(N×P-X_2)^{th}$ slot of every N×P slots i.e., at the end of the slot preceding the first slot of the $X_2$ slots of the N×P slots. In the embodiment in FIG. 6, the periodic TDD uplink-downlink transmission pattern includes $Y_1$ consecutive downlink symbols at the beginning of the $(X_1+1)^{th}$ slot of every N×P slots, and includes $Y_2$ consecutive uplink symbols at the end of the $(N×P-X_2)^{th}$ slot of every N×P slots.

Different from the periodic TDD uplink-downlink transmission pattern in FIG. 5, partial slots for downlink transmission and/or uplink transmission are supported in the periodic TDD uplink-downlink transmission pattern in FIG. 6. To fully align with eMBB/URLLC, the parameters $X_1$, $X_2$, $Y_1$, $Y_2$ and P can be set to the same values to semi-static uplink-downlink configuration for eMBB/URLLC, respectively.

Figure 7:
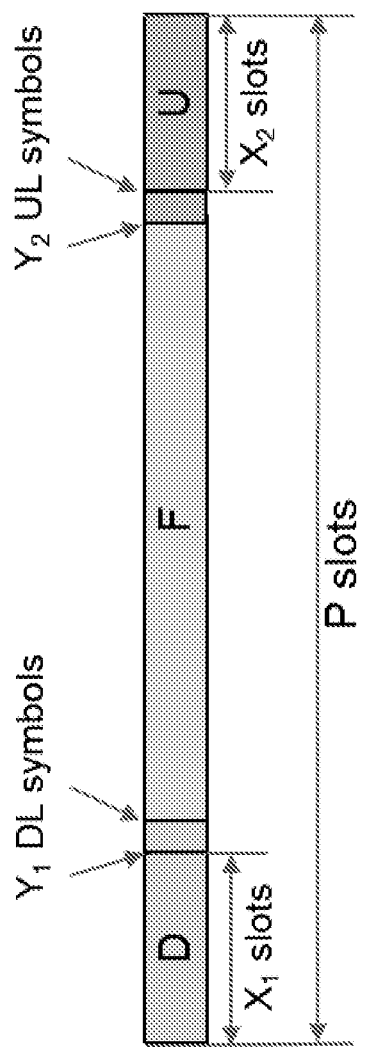
FIG. 7 illustrates another exemplary periodic TDD uplink-downlink transmission pattern in accordance with some embodiments of the present application.

FIG. 7 illustrates another exemplary periodic TDD uplink-downlink transmission pattern in accordance with some embodiments of the present application.

In this periodic TDD uplink-downlink transmission pattern, only one P slots is included, and $X_1$ "D" slots are at the beginning of the one P slots, $Y_1$ consecutive downlink symbols are at the $(X_1+1)^{th}$ slot of the P slots, $Y_2$ consecutive uplink symbols at the end of the $(P-X_2)^{th}$ slot of every P slots, $X_2$ "U" slots are at the end of the one P slots, and the rest of the P slots are "F" slots. In this embodiment, the downlink transmission and the uplink transmission can occur in the same P slots, thus the HARQ-ACK feedback delay or PUSCH transmission delay is reduced.

Figure 8:
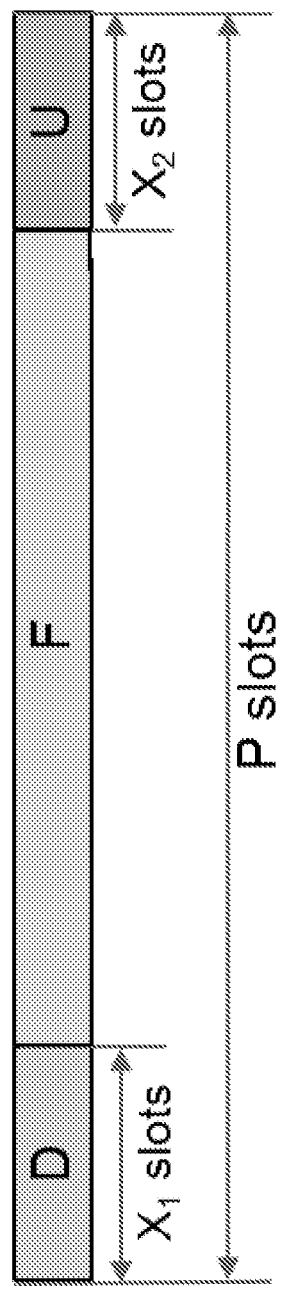
FIG. 8 illustrates another exemplary periodic TDD uplink-downlink transmission pattern in accordance with some embodiments of the present application.

If the numbers $Y_1$ and $Y_2$ are larger than 0, then partial slots for slots for downlink transmission and/or uplink transmission are supported. If the numbers $Y_1$ and $Y_2$ are set to be 0, for example, the exemplary periodic TDD uplink-downlink transmission pattern as shown in FIG. 8, then partial slots for slots for downlink transmission and/or uplink transmission are not supported.

Figure 9:
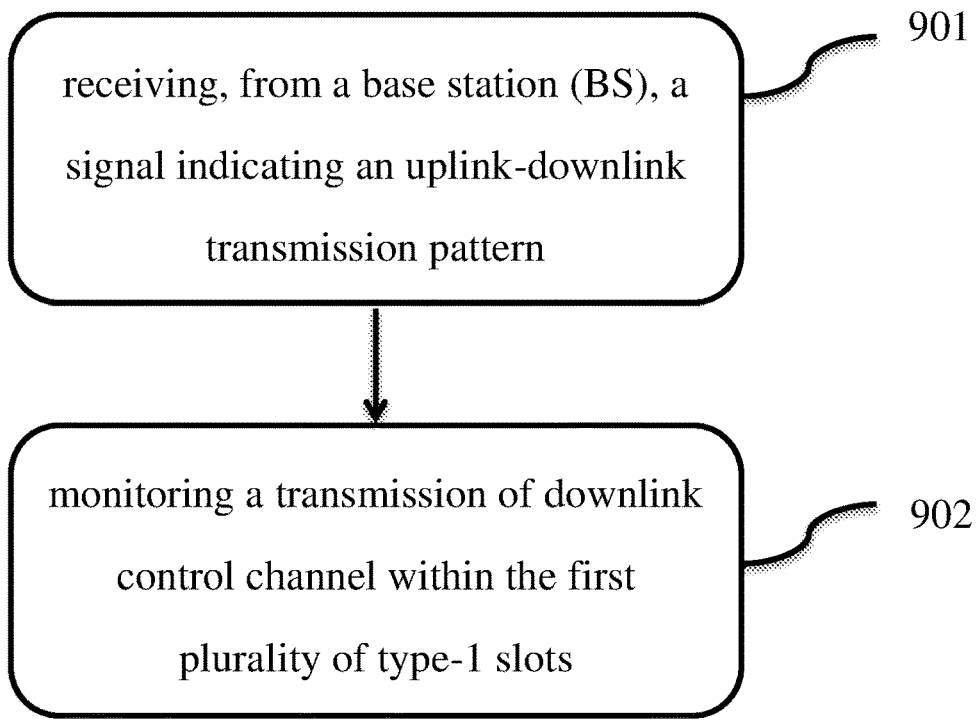
FIG. 9 illustrates a method of indicating a TDD uplink-downlink configuration according to a preferred embodiment of the subject disclosure.

FIG. 9 illustrates a method of indicating a TDD uplink-downlink configuration according to a preferred embodiment of the subject disclosure.

In the exemplary method as shown in FIG. 9, in step 901, a UE (e.g., UE 101 as shown in FIG. 1) receives, from a BS (e.g., BS 102 as shown in FIG. 1), a signal indicating an uplink-downlink transmission pattern, for example, the periodic TDD uplink-downlink transmission pattern as shown in FIGS. 2-8. The periodic TDD uplink-downlink transmission pattern may include three pluralities of different types of slots, e.g. a plurality of "D" slots, a plurality of "U" slots, and a plurality of "F" slots.

In step 902, the UE monitors a transmission of downlink control channel within the first plurality of "D" slots.

In some embodiments, based on the monitored downlink control channel, the "F" slots are for downlink transmission or uplink transmission; alternatively, the "F" slots are unavailable for the UE for downlink transmission or uplink transmission.

In some embodiments, for example, the periodic TDD uplink-downlink transmission pattern in FIG. 2, the periodic TDD uplink-downlink transmission pattern includes $N_1×P$ slots and $N_2×P$ slots, and the duration of the pattern is $N_1×P$ slots plus $N_2×P$ slots. The $N_1×P$ slots include all of the "D" slots, and the $N_2×P$ slots include all of the "U" slots. Preferably, the "D" slots are evenly distributed in the $N_1×P$ slots, and the "U" slots are evenly distributed in the $N_2×P$ slots. In another embodiment, the "D" slots are at the beginning of every P slots in the $N_1×P$ slots, and the "U" slots are at the end of every P slots in the $N_2×P$ slots.

In some embodiments, for example, the periodic TDD uplink-downlink transmission pattern in FIG. 3, the periodic TDD uplink-downlink transmission pattern further includes $Y_1$ consecutive downlink symbols which are at the beginning of a slot following the last "D" slots in the $N_1×P$ slots. The periodic TDD uplink-downlink transmission pattern may further include $Y_2$ consecutive uplink symbols which are at the end of a slot preceding the first "U" slots in the $N_2×P$ slots.

In some embodiments, for example, the periodic TDD uplink-downlink transmission pattern in FIG. 4, the periodic TDD uplink-downlink transmission pattern includes $N_3×P$ slots between the $N_1×P$ slots and $N_2×P$ slots, which only include the "F" slots. The duration of this pattern would be $N_1×P+N_2×P+N_3×P$ slots.

In some embodiments, for example, the periodic TDD uplink-downlink transmission pattern in FIG. 5, the pattern includes the "D" slots, the "U" slots, and the "F" slots, the "D" slots are at the beginning of the pattern, the "F" slots in the middle, and the "U" slots at the end. In this pattern, the "D" slots, the "U" slots, and the "F" slots are all consecutive in time domain.

In some embodiments, for example, the periodic TDD uplink-downlink transmission pattern in FIG. 6, the periodic TDD uplink-downlink transmission pattern also includes $Y_1$ consecutive downlink symbols which are at the beginning of a slot following the last "D" slots in the $N_1×P$ slots. The periodic TDD uplink-downlink transmission pattern may further include $Y_2$ consecutive uplink symbols which are at the end of a slot preceding the first "U" slots in the $N_2×P$ slots In some embodiments, for example, the periodic TDD uplink-downlink transmission pattern in FIG. 5, the periodic TDD uplink-downlink transmission pattern includes one first sub-pattern, which is composed of the "D" slots and the "F" slots, where the "D" slots at the beginning and the "F" slots at the end, and the periodic TDD uplink-downlink transmission pattern includes one second sub-pattern is composed of the "F" slots and the "U" slots, where the "F" slots at the beginning, and the "U" slots at the end. The "D" slots and the "U" slots are all consecutive. The duration of the first sub-pattern is P slots, the duration of the second sub-pattern is also P slots, and the duration of the pattern in FIG. 5 is N×P slots.

In some embodiments, for example, the periodic TDD uplink-downlink transmission pattern in FIG. 6, the periodic TDD uplink-downlink transmission pattern also includes $Y_1$ consecutive downlink symbols which are at the beginning of a slot following the last "D" slots in the N×P slots. The periodic TDD uplink-downlink transmission pattern may further include $Y_2$ consecutive uplink symbols which are at the end of a slot preceding the first "U" slots in the N×P slots.

In some embodiments, the signal indicates a reference subcarrier spacing, which is used for the UE to determine duration of the periodic TDD uplink-downlink transmission pattern, the reference subcarrier spacing could also be used to determine the duration of the first sub-pattern, for example, P as depicted in FIG. 2, or the second sub-pattern.

Figure 10:
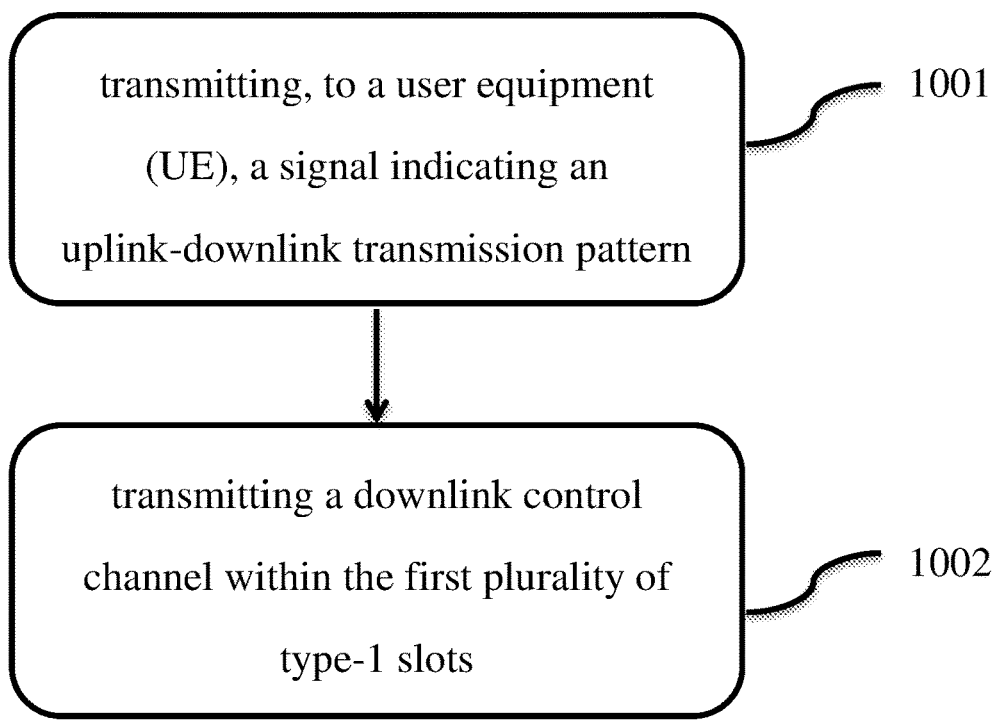
FIG. 10 illustrates a method of indicating a TDD uplink-downlink configuration according to a preferred embodiment of the subject disclosure.

FIG. 10 illustrates a method of indicating a TDD uplink-downlink configuration according to a preferred embodiment of the subject disclosure.

In the exemplary method as shown in FIG. 9, in step 1001, a BS (e.g., BS 102 as shown in FIG. 1) transmits, to a UE (e.g., UE 101 as shown in FIG. 1), a signal indicating an uplink-downlink transmission pattern, for example, the periodic TDD uplink-downlink transmission pattern as shown in FIGS. 2-8. The periodic TDD uplink-downlink transmission pattern may include three pluralities of different types of slots, e.g. a plurality of "D" slots, a plurality of "U" slots, and a plurality of "F" slots.

In step 1002, the BS transmits a downlink control channel within the first plurality of "D" slots.

Figure 11:
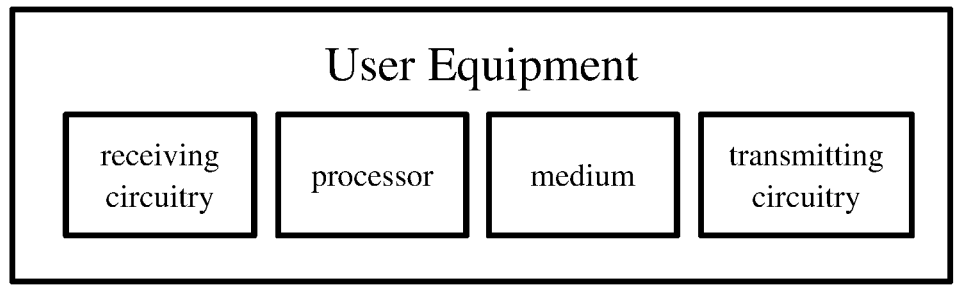
FIG. 11 illustrates a block diagram of a UE according to the embodiments of the present disclosure.

FIG. 11 illustrates a block diagram of a UE according to the embodiments of the present disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method with the at least one receiver, the at least one transmitter and the at least one processor. The method according to an embodiment of the present disclosure, for example, is the methods shown in FIGS. 9 and 10.

Figure 12:
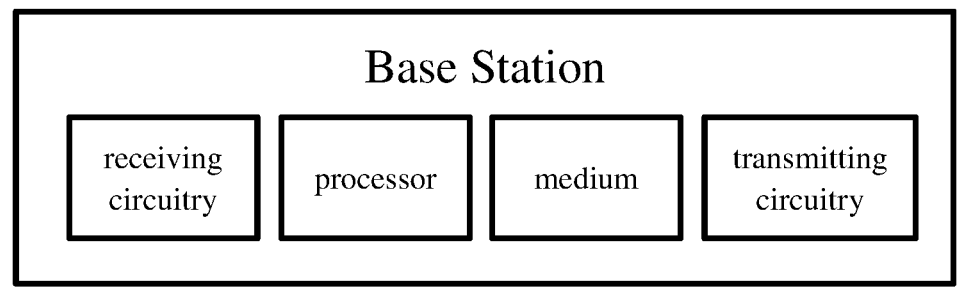
FIG. 12 illustrates a block diagram of a BS according to the embodiments of the present disclosure.

FIG. 12 depicts a block diagram of a BS according to the embodiments of the present disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method with the at least one receiver, the at least one transmitter and the at least one processor. The method according to an embodiment of the present disclosure, for example, is the methods shown in FIGS. 9 and 10.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising".

We claim:

1. A user equipment (UE), comprising:
   at least one memory; and
   at least one processor coupled with the at least one memory and configured to cause the UE to:
      receive, from a base station (BS), a signal indicating an uplink-downlink (UL-DL) transmission pattern, wherein the UL-DL transmission pattern having a first transmission period includes a first plurality of type-1 slots, a second plurality of type-2 slots, and a third plurality of type-3 slots, wherein the type-1 slots only comprise DL symbols, and the type-2 slots only comprise UL symbols; and
      monitor, in response to receiving the signal, a transmission of downlink control channel within the first plurality of type-1 slots;
      determine, based at least in part on the monitored transmission within the first plurality of type-1 slots, whether
      each slot of the type-3 slots is only for DL transmission based on the monitored transmission of the downlink control channel within the first plurality of type-1 slots, only for UL transmission based on the monitored transmission of the downlink control channel within the first plurality of type-1 slots, or unavailable for the UE for DL transmission or UL transmission; and
      cause, in response to determining that a slot of the type-3 slots is at least one of only for UL transmission or unavailable for the UE for DL transmission or UL transmission, the UE to enter into a power-saving mode during the third plurality of type-3 slots,
      wherein each slot of the type-3 slots is separate from the plurality of type-1 slots.

2. The UE of claim 1, wherein the UL-DL transmission pattern comprises a fourth plurality of first sub-patterns and a fifth plurality of second sub-patterns, wherein the fourth plurality of first sub-patterns include all of the first plurality of type-1 slots, and the fifth plurality of second sub-patterns include all of the second plurality of type-2 slots.

3. The UE of claim 2, wherein:
all of the first plurality of type-1 slots are evenly distributed in the fourth plurality of first sub-patterns, and all of the second plurality of type-2 slots are evenly distributed in the fifth plurality of second sub-patterns;
the first transmission period equals a duration of the fourth plurality of first sub-patterns plus a duration of the fifth plurality of second sub-patterns;
a duration of each of the fourth plurality of first sub-patterns equals a duration of each of the fifth plurality of second sub-patterns;
one or more of the type-1 slots are at the beginning of each of the fourth plurality of first sub-patterns;
one or more of the type-2 slots are at the end of each of the fifth plurality of second sub-patterns;
the first sub-pattern further includes a sixth number of consecutive downlink symbols at the beginning of a slot following the last type-1 slot in the first sub-pattern;
the second sub-pattern further includes a seventh number of consecutive uplink symbols at the end of a slot preceding the first type-2 slot in the second sub-pattern;
the signal further indicates a reference subcarrier spacing for the UE to determine a duration of each of the fourth plurality of first sub-patterns;
the reference subcarrier spacing is for the UE to determine a duration of each of the fifth plurality of second sub-patterns; or
some combination thereof.

4. The UE of claim 2, wherein the UL-DL transmission pattern further comprises an eighth plurality of type-3 slots, wherein the eighth plurality of type-3 slots are between the fourth plurality of first sub-patterns and the fifth plurality of second sub-patterns, and the first transmission period equals a duration of the fourth plurality of first sub-patterns plus a duration of the fifth plurality of second sub-patterns plus a duration of the eighth plurality of type-3 slots.

5. The UE of claim 1, wherein the first plurality of type-1 slots are at the beginning of the UL-DL transmission pattern, and the second plurality of type-2 slots are at the end of the UL-DL transmission pattern, and the third plurality of type-3 slots are between the first plurality of type-1 slots and the second plurality of type-2 slots.

6. The UE of claim 5, wherein:
the first plurality of type-1 slots are consecutive in time domain and the second plurality of type-2 slots are consecutive in time domain;
the UL-DL transmission pattern further includes a sixth number of consecutive downlink symbols at the beginning of a slot following the last type-1 slot;
the UL-DL transmission pattern further includes a seventh number of consecutive uplink symbols at the end of a slot preceding the first type-2 slot;_or
some combination thereof.

7. The UE of claim 5, wherein the UL-DL transmission pattern comprises a first sub-pattern and a second sub-pattern, wherein the first sub-pattern includes all the first plurality of type-1 slots, and the second sub-pattern includes all the second plurality of type-2 slots.

8. The UE of claim 7, wherein:
the first plurality of type-1 slots are consecutive at the beginning of the first sub-pattern and the second plurality of type-2 slots are consecutive at the end of the second sub-pattern;

the duration of the first sub-pattern equals a duration of the second sub-pattern, and the first transmission period equals an integer multiple of a duration of the first sub-pattern;
the first sub-pattern further includes a sixth number of consecutive downlink symbols at the beginning of a slot following the last type-1 slot;
the second sub-pattern further includes a seventh number of consecutive uplink symbols at the end of a slot preceding the first type-2 slot;
the signal further indicates a reference subcarrier spacing for the UE to determine a duration of the first sub-pattern;
the reference subcarrier spacing is for the UE to determine a duration of the second sub-pattern; or
some combination thereof.

9. The UE of claim 1, wherein the signal further indicates a reference subcarrier spacing for the UE to determine the first transmission period.

10. A base station (BS), comprising:
at least one memory; and
at least one processor coupled with the at least one memory and configured to cause the base station to:
transmit, to a user equipment (UE), a signal indicating an uplink-downlink (UL-DL) transmission pattern, wherein the UL-DL transmission pattern having a first transmission period includes a first plurality of type-1 slots, a second plurality of type-2 slots, and a third plurality of type-3 slots, wherein the type-1 slots only comprise downlink symbols, the type-2 slots only comprise uplink symbols; and
transmit, to the UE within the first plurality of type-1 slots, a downlink control channel to be monitored by the UE to determine whether,
each slot of the type-3 slots is only for downlink DL transmission based on the transmitted downlink control channel within the first plurality of type-1 slots, only for UL transmission based on the transmitted downlink control channel within the first plurality of type-1 slots, or unavailable for the UE for DL transmission or UL transmission,
wherein each of the type-3 slots is separate from the plurality of type-1 slots.

11. The base station of claim 10, wherein the UL-DL transmission pattern comprises a fourth plurality of first sub-patterns and a fifth plurality of second sub-patterns, wherein the fourth plurality of first sub-patterns include all of the first plurality of type-1 slots and the fifth plurality of second sub-patterns include all of the second plurality of type-2 slots.

12. The base station of claim 11, wherein:
all of the first plurality of type-1 slots are evenly distributed in the fourth plurality of first sub-patterns and all of the second plurality of type-2 slots are evenly distributed in the fifth plurality of second sub-patterns;
the first transmission period equals a duration of the fourth plurality of first sub-patterns plus a duration of the fifth plurality of second sub-patterns;
a duration of each of the fourth plurality of first sub-patterns equals a duration of each of the fifth plurality of second sub-patterns;
one or more of the type-1 slots are at the beginning of each of the fourth plurality of first sub-patterns;
one or more of the type-2 slots are at the end of each of the fifth plurality of second sub-patterns;

the first sub-pattern further includes a sixth number of consecutive downlink symbols at the beginning of a slot following the last type-1 slot in the first sub-pattern;

the second sub-pattern further includes a seventh number of consecutive uplink symbols at the end of a slot preceding the first type-2 slot in the second sub-pattern;

the signal further indicates a reference subcarrier spacing for the UE to determine a duration of each of the fourth plurality of first sub-patterns;

the reference subcarrier spacing is for the UE to determine a duration of each of the fifth plurality of second sub-patterns; or some combination thereof.

13. The base station of claim 11, wherein the UL-DL transmission pattern further comprises an eighth plurality of type-3 slots, wherein the eighth plurality of type-3 slots are between the fourth plurality of first sub-patterns and the fifth plurality of second sub-patterns, and the first transmission period equals a duration of the fourth plurality of first sub-patterns plus a duration of the fifth plurality of second sub-patterns plus a duration of the eighth plurality of type-3 slots.

14. The base station of claim 10, wherein the first plurality of type-1 slots are at the beginning of the UL-DL transmission pattern and the second plurality of type-2 slots are at the end of the UL-DL transmission pattern and the third plurality of type-3 slots are between the first plurality of type-1 slots and the second plurality of type-2 slots.

15. The base station of claim 14, wherein:
the first plurality of type-1 slots are consecutive in time domain and the second plurality of type-2 slots are consecutive in time domain;
the UL-DL transmission pattern further includes a sixth number of consecutive downlink symbols at the beginning of a slot following the last type-1 slot;
the UL-DL transmission pattern further includes a seventh number of consecutive uplink symbols at the end of a slot preceding the first type-2 slot;_ or
some combination thereof.

16. The base station of claim 14, wherein the UL-DL transmission pattern comprises a first sub-pattern and a second sub-pattern, wherein the first sub-pattern includes all the first plurality of type-1 slots and the second sub-pattern includes all the second plurality of type-2 slots.

17. The base station of claim 16, wherein:
the first plurality of type-1 slots are consecutive at the beginning of the first sub-pattern and the second plurality of type-2 slots are consecutive at the end of the second sub-pattern;
the duration of the first sub-pattern equals a duration of the second sub-pattern, and the first transmission period equals an integer multiple of a duration of the first sub-pattern;
the first sub-pattern further includes a sixth number of consecutive downlink symbols at the beginning of a slot following the last type-1 slot;

the second sub-pattern further includes a seventh number of consecutive uplink symbols at the end of a slot preceding the first type-2 slot;
the signal further indicates a reference subcarrier spacing for the UE to determine a duration of the first sub-pattern;
the reference subcarrier spacing is for the UE to determine a duration of the second sub-pattern; or
some combination thereof.

18. A method performed by a user equipment (UE), the method comprising:
receiving, from a base station (BS), a signal indicating an uplink-downlink (UL-DL) transmission pattern, wherein the UL-DL transmission pattern having a first transmission period includes a first plurality of type-1 slots, a second plurality of type-2 slots, and a third plurality of type-3 slots, wherein the type-1 slots only comprise downlink symbols, and the type-2 slots only comprise uplink symbols; and
monitoring, in response to receiving the signal, a transmission of downlink control channel within the first plurality of type-1 slots;
determining, based at least in part on the monitored transmission within the first plurality of type-1 slots, whether,
each slot of the type-3 slots is only for downlink DL transmission based on the monitored transmission of the downlink control channel within the first plurality of type-1 slots, only for UL transmission based on the monitored transmission of the downlink control channel within the first plurality of type-1 slots, or unavailable for the UE for DL transmission or UL transmission; and
causing, in response to determining based at least in part on the monitored transmission that a slot of the type-3 slots is at least one of only for UL transmission or unavailable for the UE for DL transmission or UL transmission, the UE to enter into a power-saving mode during the third plurality of type-3 slots,
wherein each slot of the type-3 slots is separate from the plurality of type-1 slots.

19. The UE of claim 1, wherein the at least one processor is further configured to cause the UE to enter into a power-saving mode during the second plurality of type-2 slots and the third plurality of type-3 slots after monitoring the transmission of the downlink control channel within the first plurality of type-1 slots and in response to the monitoring.

20. The method of claim 18, further comprising entering into a power-saving mode during the second plurality of type-2 slots and the third plurality of type-3 slots after monitoring the transmission of the downlink control channel within the first plurality of type-1 slots and in response to the monitoring.

* * * * *